March 14, 1950 A. E. CLEVELAND 2,500,663
LIQUID FUEL BURNING APPARATUS AND ELECTRICAL
CONTROL MEANS THEREFOR
Filed Dec. 31, 1946 2 Sheets-Sheet 1

INVENTOR,
Allen E. Cleveland
BY
Hull & West
ATTYS.

Patented Mar. 14, 1950

2,500,663

UNITED STATES PATENT OFFICE 2,500,663

LIQUID FUEL BURNING APPARATUS AND ELECTRICAL CONTROL MEANS THEREFOR

Allen E. Cleveland, Cleveland Heights, Ohio, assignor to Perfection Stove Company, Cleveland, Ohio, a corporation of Ohio Application December 31, 1946, Serial No. 719,374

11 Claims. (Cl. 126—110)

This invention consists of improvements in electrical control systems for governing the operation of heating apparatus of the class in which liquid fuel is used, particularly apparatus of this class employed on automotive vehicles for warming the engine to facilitate starting in cold weather and/or heating an interior part of the vehicle for the protection of its contents or the comfort of its occupants.

The main object of the invention is to provide a thoroughly reliable electrical control system by which a given sequence of operations is obtained in an especially desirable manner and wherein a minimum number of electrical relays or the like are required, thus simplifying the system and promoting economy from both standpoints of production and use.

The system includes several electrical devices which, respectively, require different amounts of current, as, for example, a hot wire igniter for the burner of the heating apparatus; electrical resistance heaters for causing the operation of thermostatic switches; motors; small relays, etc.; and the object above set forth is attained by organizing certain of the electrical devices in circuits in such manner as will divide the voltage and properly apportion it among the several devices whereby they will be caused to function, some at full capacity and others at partial capacity during one phase of the cycle of operation while others will remain inactive; then, during another phase, these conditions may be reversed or modified, and during still another phase certain of said devices will be caused to cease functioning for the reason of their being deprived of current which is demanded by other previously idle devices that are subsequently set in operation. This voltage-dividing or current apportioning feature is the principal characteristic of my invention.

Other objects, among which are the provision of safeguards against conditions that might prove dangerous or expensive, will become apparent as this disclosure unfolds.

Figure 1:
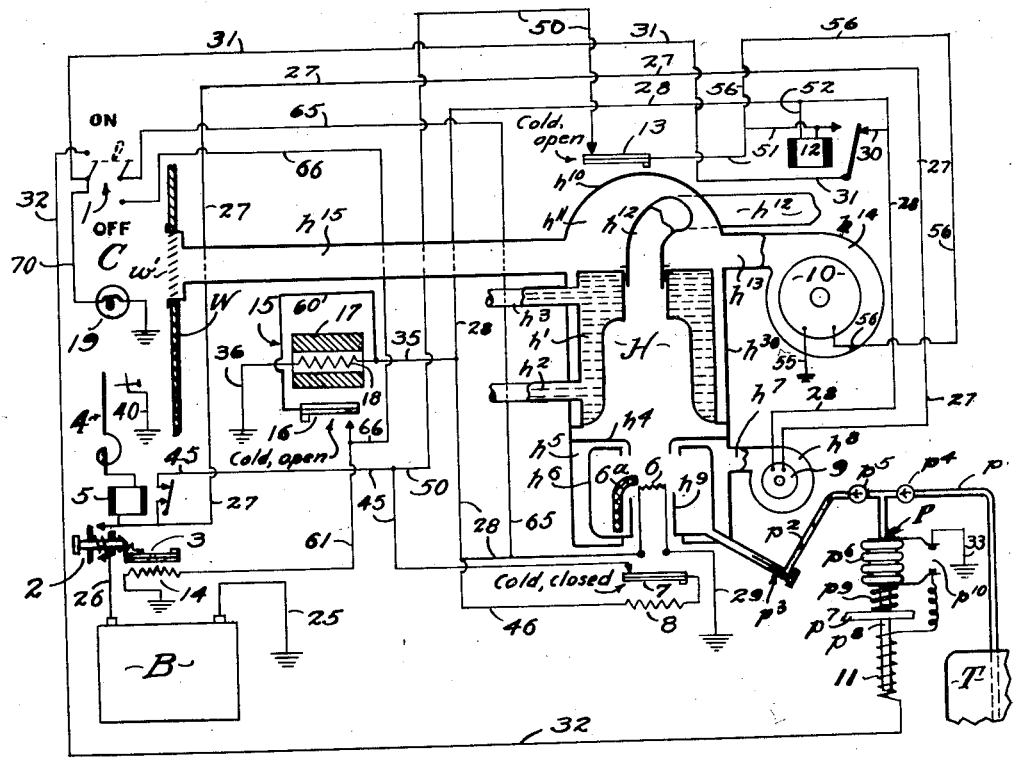
Figure 2:
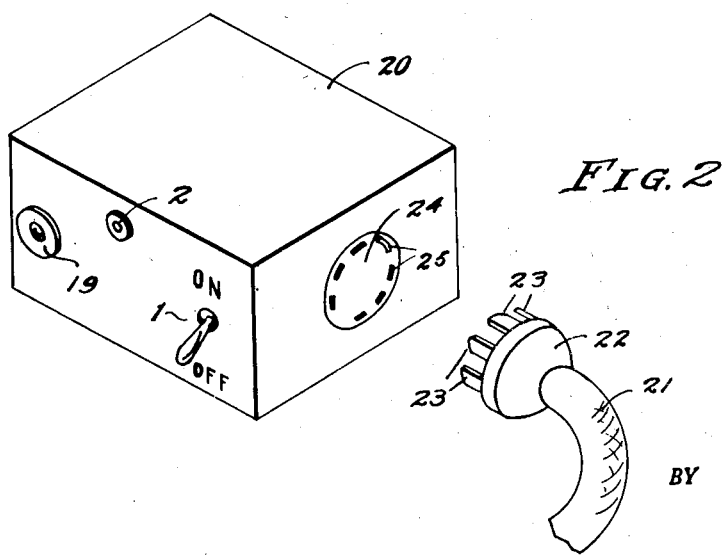
Figure 3:
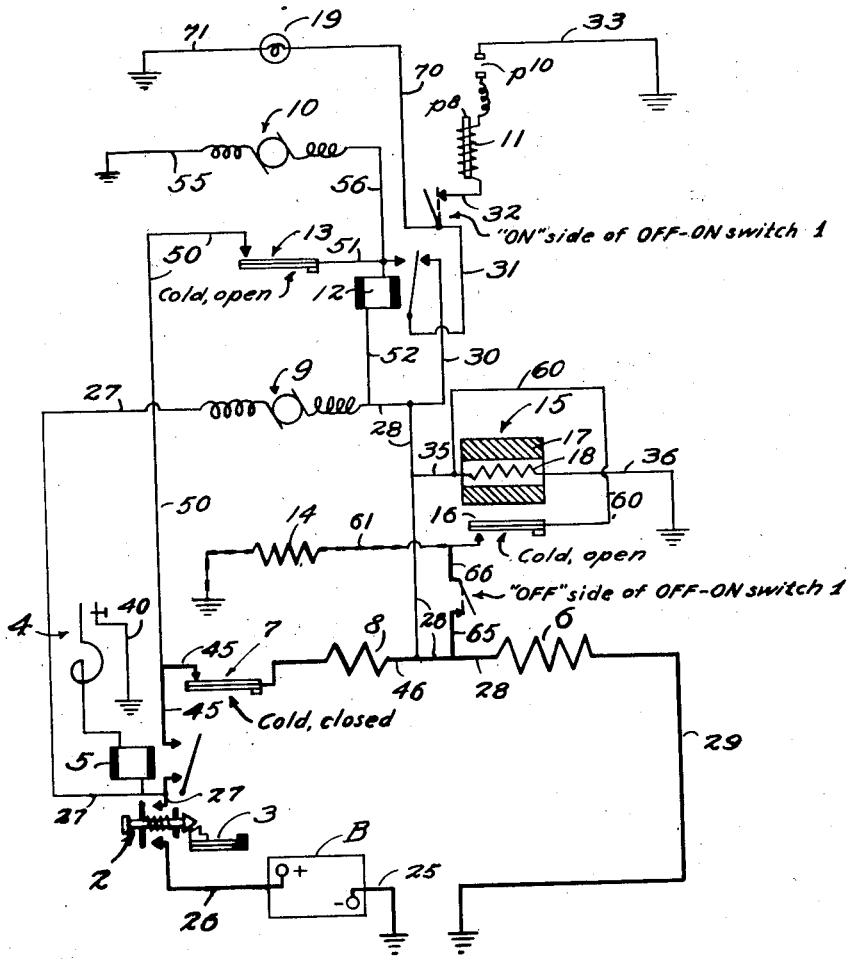

In the drawings, wherein reference characters are used to designate the various devices and circuits of the system and associated parts, Fig. 1 is a diagrammatic representation of the system and associated parts; Fig. 2 is a perspective view of a unit adapted for installation on a vehicle, for instance, and incorporating the majority of the electrical devices and circuits of the invention, and Fig. 3 is a simplified diagram that is confined to the electrical devices and circuits.

The system, being especially intended for use on automobile vehicles, is so illustrated schematically in Fig. 1 where W designates a wall enclosing a compartment C. This may be the driver's cab of a truck or van, or some other interior part of the vehicle. H is the heating apparatus which, in the present instance, includes a liquid circulating element $h'$ that constitutes a heat exchanger, and inlet and outlet connections $h^2$ and $h^3$, respectively, which lead to the coolant circulating space or water jacket of the engine which, as is customary, is in circulation with the usual radiator (not shown). For an example of such an installation, reference may be had to the application of Marc Resek, Serial No. 674,012, filed June 3, 1946, and assigned to the present assignee. The circulating element $h'$ is enclosed within a casing $h^{30}$, the interior of which is divided by a partition $h^4$ into a combustion chamber in which the circulating element $h'$ is located, and an air chamber $h^5$ therebelow, in which is situated a pot type burner $h^6$. Combustion air is supplied to the chamber $h^5$, through a tubular connection $h^7$ from an air impeller or fan $h^8$, hereinafter called the combustion fan. The burner $h^6$ is similar to the burner shown in the above mentioned application, and the interior of the pot communicates with the combustion chamber through an opening in the top wall of the pot and a registering opening in the partition $h^4$. A tubular wall $h^9$ rises from the bottom wall of the pot and is sealed thereto about a central opening in said wall.

A dome $h^{10}$ surmounts the casing $h^{30}$ and encloses a plenum chamber $h^{11}$ through which a flue $h^{12}$ extends that carries off the products of combustion, said flue passing laterally through an opening in the side of the dome and continuing on to a convenient place of discharge. A duct $h^{13}$ leads into one side of the dome $h^{10}$ from an air impeller or fresh air blower $h^{14}$, and a conduit $h^{15}$ leads from the dome $h^{10}$ to a register $w'$ in the wall W through which the heated air impelled through the dome and through the conduit $h^{15}$ is delivered to the compartment C.

P is a pump which draws liquid fuel from a tank T through a pipe $p'$ and delivers it through a pipe $p^2$ and a flow retarder or restricter $p^3$ to the burner pot $h^6$. The pipe $p'$ is provided with a check valve $p^4$ that opens toward the pump, and the pipe $p^2$ includes a check valve $p^5$ that opens toward the burner. The pump P, which is conventionally shown, may consist of what is known to the trade as an Autopulse pump, and the pumping chamber consists of a bellows $p^6$. Connected to one end of the bellows and extending through an opening in an abutment $p^7$, is the core $p^8$ of a solenoid, and between the abutment $p^7$ and the opposed wall of the pumping chamber is a compression spring $p^9$. It is evident from the foregoing description that when the solenoid of which the core $p^8$ forms a part is energized, the core will be moved in opposition to the spring $p^9$, in a direction to expand the pumping chamber $p^6$ and draw in a charge of fuel from the tank T through the pipes $p'$ and past the check valve $p^4$; and when the solenoid is deenergized the spring $p^9$ will tend to contract the pumping chamber and force the fuel past the check valve $p^5$ through the pipe $p^2$ and restrictor $p^3$ to the burner pot $h^6$, said restrictor controlling the flow of the fuel and thus the speed at which the spring $p^9$ will contract the pumping chamber. Included in the pump is a circuit closer $p^{10}$ that consists of contacts represented as carried by the opposite ends of the pumping chamber and which are engaged when the pumping chamber is contracted.

A source of electrical energy is represented as a storage battery B, which may be especially provided for use with my control system, or it may be the same battery which supplies current for the ignition system of the engine and other purposes on the vehicle. It may also be explained that the tank T may be the main tank of the vehicle from which the engine receives its fuel, or it may be one for exclusive use with the heating apparatus.

The invention, as herein disclosed, includes a so-called room thermostat that is situated in the space to which warm air is conducted from the heating apparatus—in the present instance, the compartment C. I wish it to be understood, however, that the inclusion of said thermostat, as well as the warm air supply means, is optional, as there are circumstances under which the use of my improved control system is highly advantageous where neither of these features is needed. I may further explain that, in some instances, it may be desirable to substitute a time switch or other form of remote control for the room thermostat.

As herein disclosed, the control system includes, along with the source of electrical energy or battery B, the following electrical devices (all of which appear in the simplified diagram of Fig. 3, as well as in Fig. 1): an "off-on" switch 1, so called because when in "off" position the system is inoperative excepting for a safety feature, and when in "on" position the system is in condition for normal operation; a starting switch 2, preferably of the push-button variety; a thermostatic latch 3 for holding the starting switch closed; room thermostat 4; room thermostat relay 5, an electrical igniter 6 for the liquid fuel burner of the heating apparatus H; igniter thermostatic switch 7; igniter cut-out resistance 8 for heating the igniter thermostatic switch; combustion fan motor 9; fresh air blower motor 10; fuel pump solenoid 11; pump relay 12; fuel pump thermostatic switch 13; overload resistance 14, arranged in heat exchanging relation to the thermostatic latch 3 for actuating the latter; time-delay cutout, designated generally by the reference numeral 15 and including a time-delay thermostatic switch 16, heat absorber 17, and an electrical resistance heater 18; and a signal device 19, represented as an incandescent lamp.

The simplified diagram that constitutes Fig. 3 of the drawings illustrates more graphically than Fig. 1 the division of the voltage or, in other words, the apportionment of the current among the several electrical circuits of the system. It further differs from the diagram of Fig. 1 in that it does not include the heating apparatus and other parts with which the electrical circuits and devices are associated, nor does it properly indicate, as does Fig. 1, the relative positions of the electrical devices. These considerations had to be discarded in the simplifying of the circuits.

Fig. 3 shows the ignition circuit, which will presently be described, in heavy lines, in contrast to the light line showing of the other circuits. This has substance in the fact that conductors of much greater capacity are used for the ignition circuit than for the other circuits. In practice, a 12-gauge wire is found suitable for the ignition circuit, while wires of smaller cross section are satisfactory for the other circuits. The primary purpose of the different weight lines, however, is to indicate relative amperage of the different circuits; and where one circuit is required to carry a very heavy current at one time, and relatively light currents at other times, this is indicated by superposing heavy dots on a light line. Furthermore, in the simplified diagram, the circuits may be followed with greater ease than in Fig. 1, and the difference in power of the various circuits may be more readily comprehended.

I shall now describe the circuits that include the various electrical devices hereinbefore mentioned by designating the conductors whereof said circuits are composed. One side of the battery B is grounded through a conductor 25, while a conductor 26 leads from the other side of the battery to the starting switch 2. Continuing on from the starting switch to the motor 9 of the combustion fan is a conductor 27, and a conductor 28 extends from said motor to the igniter 6, the latter being grounded through a conductor 29. Branching off from the conductor 28 is another conductor designated 30 which has a terminal contact that is engaged by the armature of the pump relay 12, when said armature is in the position it occupies during the time said relay is deenergized, and continuing from the armature is a conductor 31 that leads to the "on" side of the "off-on" switch 1. Said switch has connection, through a conductor 32, with the coil of the pump solenoid 11 and through the latter with the circuit closer $p^{10}$, said circuit closer being grounded through a conductor 33. Also leading from the conductor 28 to the resistance 18 of the time-delay cutout 15 is a conductor 35, said resistance being grounded through a conductor 36.

The coil of the previously mentioned relay 5 is in a circuit that branches off from the conductor 27 beyond the starting switch and leads to the room thermostat 4, the current thus supplied to the room thermostat continuing to ground through a conductor 40 when the switch constituted of the room thermostat is closed. Energization of the relay 5 closes, through its armature, what I shall refer to hereinafter as the ignition circuit. This circuit starts from the conductor 27 and includes the armature of said relay and a conductor 45 that leads to the igniter thermostatic switch 7. In circuit with said switch, as will clearly appear from the diagrams of Figs. 1 and 3, is the igniter cutout resistance 8, and a conductor 46 continues on from said resistance to the part of the previously mentioned conductor 28 that leads to the igniter 6. As will more fully appear hereinafter, the operation of the fuel pump actuator is controlled by the above described circuits.

Branching off from the conductor 45 is a conductor 50 having a terminal contact arranged to be engaged by the bimetal element of the pump thermostatic switch 13. It will be understood, of course, that I do not limit my invention to electrical devices of the character represented by the symbols employed in the diagrams. Any known equivalents may be substituted in practice without departing from the spirit of the invention. A conductor 51 leads from the switch 13 to one end of the coil of the relay 12 the other end of said coil being connected through a conductor 52 to the previously mentioned conductor 28. A circuit that includes the motor 10 of the fresh air blower $h^{14}$ is formed by conductors 55 and 56, the former leading from motor 10 to ground, and the latter joining conductor 51 between the switch 13 and relay 12. A conductor 60 leads from the conductor 35, between the resistance 18 and the conductor 28, to the bimetal element of the thermostatic switch 16 which forms a part of the time-delay cutout 15, and a conductor 61 continues on from said switch 16 to the grounded overload resistance 14. A shunt circuit, represented by conductors 65 and 66 and including the "off" side of the "off-on" switch 1, connects the ignition circuit and the overload cutout circuit represented by the previously mentioned conductor 61.

A conductor 70 leads from the conductor 31, where the latter is connected to the "on" side of the "off-on" switch 1, to the signal device 19, and said device is grounded through a conductor 71.

In considering the operation of the invention, it will be assumed that a low atmospheric temperature prevails and that the compartment C of the vehicle, and the engine (not shown), are correspondingly cold. Under these conditions, the switch constituted of the room thermostat 4, located in the compartment C, is closed. Also, as indicated on the drawing, the igniter thermostatic switch 7 is closed when cold, while the fuel pump thermostatic switch 13, arranged in heat receiving relation to the dome $h^{10}$ of the heating apparatus H, and the time-delay thermostatic switch 16, are open when cold. The system is now placed in condition for normal operation by throwing the "off-on" switch 1 to "on" position, and a cycle of operation is started by closing the starting switch 2.

Remembering that the room thermostat has been so affected by the surrounding temperature as to close the switch constituted thereof, the relay 5, which is in circuit with said thermostat, is energized so as to move its armature to a position to bridge the contacts associated therewith. Accordingly, current now flows from the battery through conductor 26, the starting switch 2, the armature of relay 5 and conductor 45, to the igniter thermostatic switch 7 and on through the igniter cutout resistance 8, conductors 46 and 28, to the igniter 6, and thence to ground through the conductor 29. Under these conditions, the ignition circuit will draw from 16 to 18 amperes, which current in passing through said resistance 8 and igniter 6 creates a voltage drop across each of these resistances (resistance 8 and igniter 6) proportioned as the resistances, the sum of said voltage drops being equal to the voltage of the battery less negligible line loss. These voltage drops, as proportioned or divided between resistance 8 and igniter 6, constitute two sources of potential by which certain of the other electrical devices in the circuits previously described may be caused to operate at part or full capacity.

A circuit from the battery B through conductor 26, starting switch 2, conductor 27, combustion fan motor 9, conductor 28, igniter 6, and conductor 29 to ground, is in parallel with igniter thermostatic resistance 8, and when current is flowing to the igniter through resistance 8 the combustion fan motor will operate at reduced speed on that portion of the battery voltage proportioned between the relative resistances of igniter cutout resistance 8 and igniter 6. At such time as igniter thermostatic switch 7 is open, the resistance of the parallel circuit including the igniter thermostatic switch 7 and igniter cutout resistance 8 is infinite, so that the entire battery voltage is applied to the combustion fan motor 9 (now in series with the igniter 6) causing it to operate at full speed. The combustion fan motor, it may be explained, draws a much smaller current than the ignition circuit previously described, with a consequent negligible voltage drop through the igniter 6 to ground, and through which the combustion fan motor circuit is completed.

Assuming, as we continue with the operation, that the igniter thermostatic switch 7 is closed because the burner is cold, and that liquid fuel is present in the burner $h^6$, a small amount of said fuel, conducted by wick $6^a$ into proximity to the igniter 6, will be vaporized and ignited, resulting in the lighting of the burner. However, in order that fuel be present in the burner at the beginning of an operation, the pumping chamber $p^6$ of the pump P must be charged with fuel and released to the action of the spring $p^9$. To charge the pump with fuel, the pump solenoid 11 must be energized to retract the core $p^8$ thereof and expand the pumping chamber $p^6$. Current is supplied to the pump solenoid from the conductor 28 through the conductor 30, the armature of the pump relay 12, conductor 31, "off-on" switch 1, and conductor 32 that leads to one end of the coil of the pump solenoid 11. The other end of said coil is connected to one of the contacts of the circuit closer $p^{10}$, the other contact whereof is grounded through the conductor 33. Therefore, upon starting a cycle of operation in the manner above described, at which time the pump chamber $p^6$ is contracted and the contacts of the circuit closer $p^{10}$ are together inasmuch as they are always left in this condition at the close of a cycle, current will flow through the coil of the pump solenoid for the instant necessary to expand the pumping chamber and draw in a charge of fuel. Simultaneously the contacts of the circuit closer $p^{10}$ will separate, breaking the circuit and releasing the pump chamber to the contracting influence of the spring $p^9$ under the control of the restrictor $p^3$, as above explained. Only for the negligible instant that the pump solenoid is energized, will the igniter 6 be deprieved of the current required for such energization.

During the present phase of the cycle of operation, a small part of the current may pass from the conductor 28 through the conductor 35, electrical resistance heater 18 of the time-delay cutout 15, and conductor 36 to the ground. Heat generated in the resistance 18 is stored in the heat absorber 17, which consists of a relatively large body or mass of iron or other heat absorbing material.

A part of the current carried by the starting switch passes through the relay 5 and its associated conductors to the room thermostat 4 and thence to the ground through the conductor 40, it being remembered that under the presently assumed conditions the room thermostat is closed. Energization of the relay 5 closes the ignition circuit which includes the ignition cutout resistance 8, and flow of current through said resistance for the period of time normally required to light the burner so elevates the temperature of said resistance as to cause it to effect the opening of the igniter thermostatic switch 7. This stops supply of current to said resistance 8, and reduces to a negligible amount the current passing through the igniter, at the same time establishing an infinitely high resistance across that leg of the voltage divider circuit previously described as including resistance 8 in voltage divider relationship to igniter 6 and thereby establishes full battery voltage, less negligible line loss and the small voltage drop across the igniter 6, to the motor 9. Under the conditions just described, the motor 9 will operate the combustion air fan at sufficient speed to meet the normal air requirements of the burner. However, with the burner in normal operation, sufficient heat is radiated therefrom to the igniter thermostatic switch 7 to maintain said switch in open condition after the resistance 8 cools.

As the heating apparatus H continues to function, it will warm the contents of the cooling system of the engine by reason of the fact that the circulating element or heat exchanger $h'$ is in circuit with said system. However, just as soon as the flame from the burner has reached the flue $h^{12}$, the pump thermostatic switch 13 closes under the influence of the heat thus supplied thereto, establishing a circuit from the conductor 45 through conductor 50, switch 13, conductor 51, pump relay 12, and conductor 52 to the conductor 28 and thence to ground through the paths of the igniter and the time-delay cutout. Energization of the relay 12 in the manner just described will cause its armature to swing from the contact terminal of conductor 30 to the contact terminal of the conductor 51 (speaking in terms appropriate to the schematic illustration, without intent of limiting the invention) thereby to supply current under the present conditions through said armature to the conductor 31 and thence through the "off-on" switch 1 and conductor 32 to the pump solenoid 11. Current will also flow from the conductor 51, through conductor 56 to the motor 10 of the fresh air blower and thence through conductor 55 to the ground. With the motor 10 in operation, fresh air will be impelled by the blower $h^{14}$ through the dome $h^{10}$ of the heating apparatus and, thus warmed, will continue on through the conduit $h^{15}$ and register $w'$ to the compartment C. Upon the temperature of this compartment being raised to a predetermined value for which the room thermostat 4 is set, said thermostat will open, deenergizing the relay 5 and opening the electrical connections between the source of electrical energy and the conductor 45.

In case the burner does not light, and, accordingly, a normal cycle of operation fails to ensue, flow of current for the period ordinarily required for lighting through the igniter cutout resistance 8 will cause the latter to heat up sufficiently to effect the opening of the igniter thermostatic switch 7 and thereby reduce the supply of current to the igniter to a negligible degree. Inasmuch as the resistance 8 is in series with the thermostatic switch 7, opening of said switch cuts off current to the resistance 8 and the latter cools. However, in the absence of heat from the burner, the thermostatic switch 7 will shortly close of its own accord and re-establish the ignition circuit, affording another opportunity for the burner to light. In the event that the burner does not light, the temperature of the heating apparatus will not rise enough to cause the fuel pump thermostatic switch 13 to close, thus leaving open the circuit that controls the pump relay 12.

Prolonged failure of the burner to ignite results in sufficient heat being stored up in the heat absorber 17 of the time-delay cutout 15 to cause said absorber to radiate enough heat to the thermostatic switch 16 to result in said switch closing. The closing of this switch diverts current from the conductor 35 through conductor 60, the bimetal element of said thermostatic switch 16, and conductor 61 to the overload resistance 14 and thence to the ground. Heat generated by the overload resistance 14 will cause the thermostatic latch 3 to release the starting switch, allowing it to open and break all circuits of the system. It should here be explained that the capacity of the absorber 17 is desirably such that in the time required to heat it enough to affect the thermostatic switch in the manner aforesaid, the igniter thermostatic switch 7 will open and close several times, thus affording repeated opportunities for the burner to light.

Returning to a consideration of a normal cycle of operation, wherein the burner lights: the igniter thermostatic switch 7 opens and is maintained so by the heat of the apparatus H; the fuel pump thermostatic switch 13 is caused to close and remain so by heat from the same source, and the motor 10 of the fresh air blower $h^{14}$ operates to impel air through the dome of the heating apparatus and on to the compartment C. Now, when the temperature of said compartment rises sufficiently to cause the room thermostat 4 to open, the relay 5 will be deenergized thereby to open the circuit to the motor 10 and stop operation of the fresh air blower. Because the circuit including the pump relay 12 depends for its current upon the relay 5, deenergization of said relay will cause the breaking of the circuit to the pump relay 12, thereby causing the armature of the latter to withdraw from the contact terminal of the conductor 51 and resume engagement with the contact terminal of the conductor 30, making the pump solenoid 11 now dependent for its supply of current on the previously described ignition circuit when the latter is again effective.

When, under the influence of a low atmospheric temperature, the temperature within the compartment C drops sufficiently to cause the room thermostat 4 to function in a manner to close the circuit through the relay 5 and thus re-establish the circuit to the motor 10, warm air will again be supplied to the compartment, the action of the room thermostat 4 repeating at intervals so long as the system is maintained operative by leaving the "off-on" switch 1 in "on" position and the starting switch 2 closed.

To manually shut down the system, the "off-on" switch 1 is thrown to "off" position, thereby opening the fuel pump solenoid circuit. Now current will flow by way of the starting switch 2 and conductor 27 to the motor 9 of the combustion air fan, and thence through the conductor 28, the igniter 6 and conductor 29 to the ground. With the burner deprived of fuel by reason of the opening of the pump solenoid circuit, the fire will go out, and continued operation of the combustion fan will purge the burner of residual gases and cool the apparatus. Under the conditions now prevailing, the temperature of compartment C will fall and the room thermostat 4 will operate to close the circuit of relay 5. Also, with the cooling of the burner, the igniter thermostatic switch 7 closes, and current will now flow from battery B, through the conductor 26, starting switch 2, adjacent portion of conductor 27, the armature of the relay 5, conductor 45, bimetal element of the igniter thermostatic switch 7, resistance 8, conductor 46 and an adjacent part of conductor 28, conductor 65, through "off" side of "off-on" switch 1, and conductors 66 and 61, to overload resistance 14 and thence to ground. Under the present heavy current, the resistance 14 heats quickly and causes instantaneous release of the starting switch 2, thus shutting off the supply of current from the battery to the system.

After the burner has been lit and a normal cycle of operation ensues, this fact is indicated by a steady brilliant glow of the lamp that constitutes the signal device 19, current being supplied thereto through the conductor 70 and continuing on to ground through the conductor 71. During such cycle, the igniter thermostatic switch 7 is maintained open under the influence of the heat given off by the burner.

The unit illustrated in Fig. 2, commonly referred to as the control box, consists of a cabinet 20 in which are housed all of the electrical devices and circuits of the system excepting those that have to be located elsewhere by reason of their character or their association with remote objects. The electrical devices, with their circuits or parts thereof, which are outside the cabinet are: the source of electrical energy or battery B, the thermostatic switches 7 and 13, the electrical resistance heater 8, the igniter 6, the motors 9 and 10, the pump solenoid 11, the circuit closer $p^{10}$, and the room thermostat 4.

Those conductors which form the circuits, or parts thereof, that are outside the cabinet 20 are enclosed within a cable 21 to the end of which is attached a plug 22 having the required number of prongs 23 that represent the terminals of the conductors; and the control box or unit is equipped with a receptacle 24 that is exposed through an end wall of the cabinet and has sockets 25 for the reception of said prongs 23.

Thus it will be seen that, in practice, the installation of my improved control system is made relatively simple, and that it is compact and occupies very little room.

Having thus described my invention, what I claim is:

1. In a system involving heating apparatus incorporating a liquid fuel burner, and electrical control means therefor; a liquid fuel supply, a pump for moving fuel from said supply to the burner, an electrical actuator for the pump, an electrical igniter for the burner, a starting switch, a thermostatic ignition control switch exposed to the heat of the apparatus and adapted to be held open under the influence thereof, an electrical heater in heat exchanging relation to said ignition control switch, an overload cutout which, when subjected to a given value of current for a predetermined time, effects the opening of the starting switch, a source of electrical energy, an electrical circuit including said source, the starting switch, said thermostatic ignition control switch, the aforesaid electrical heater and the igniter, and two branch circuits in parallel relation to said igniter, one of which includes said actuator for the pump and the other of which includes said overload cutout.

2. In a system involving heating apparatus incorporating a liquid fuel burner and an air impeller for supplying combustion air to the burner, and electrical control means for said apparatus; a liquid fuel supply, means for conveying fuel from said supply to the burner, an electrical igniter for the burner, an electric motor for driving the air impeller, a thermostatic switch exposed to, and adapted to be held open under the influence of, the heat of the apparatus, an electrical heater in heat exchanging relation to said switch and serving, when energized for a given period of time, to supply sufficient heat thereto to cause said thermostatic switch to open in the absence of heat from said heating apparatus, a source of electrical energy, an electrical circuit including said source, said switch, said electrical heater and the igniter, and a shunt circuit in parallel relation to that part of the former circuit that includes the switch and electrical heater, said shunt circuit including the aforesaid motor.

3. In a system involving heating apparatus incorporating a liquid fuel burner and an air impeller for supplying combustion air to the burner, and electrical control means for said apparatus; a liquid fuel supply, a pump for moving fuel from said supply to the burner, an electrical actuator for the pump, an electrical igniter for the burner, an electric motor for operating the air impeller, a thermostatic switch exposed to and adapted to be held open under the influence of the heat of the apparatus, an electrical heater in heat exchanging relation to said switch and serving, when energized for a given period of time, to supply sufficient heat thereto to cause said thermostatic switch to open in the absence of heat from said heating apparatus, a source of electrical energy, an electrical circuit including said source, said switch, said electrical heater and the igniter, a shunt circuit in parallel relation to that part of the former circuit that includes the switch and electrical heater, said shunt circuit including said electric motor, and a branch circuit in parallel relation to said igniter and including the actuator for the pump.

4. In a system involving heating apparatus incorporating a liquid fuel burner, and electrical control means therefor; a liquid fuel supply, a pump for moving fuel from said supply to the burner, an electrical actuator for the pump, an electrical igniter for the burner, a thermostatic ignition control switch exposed to and adapted to be held open under the influence of the heat of the apparatus, an electrical heater in heat exchanging relation to said switch, a source of electrical energy, an electrical circuit including said source, said switch, said electrical heater and the igniter, a branch circuit in parallel relation to said igniter and including said actuator for the pump, a second thermostatic switch exposed to and adapted to be held closed under the influence of the heat of the apparatus, a relay comprising coil and switch armature, said armature constituting a part of the said branch circuit while in the position it occupies when the relay is deenergized, a second branch circuit in series with said igniter and source and including the second mentioned thermostatic switch and the coil of said relay, said armature, when in the position it occupies during energization of the relay, interrupting the first mentioned branch circuit and a circuit including said armature in energized position and said second mentioned thermostatic switch and connecting the pump actuator directly to said source.

5. In a system involving heating apparatus incorporating a liquid fuel burner and an air impeller for supplying combustion air to the burner, and electrical control means for said apparatus; a liquid fuel supply, a pump for moving fuel from said supply to the burner, an electrical actuator for the pump, an electrical igniter for the burner, an electric motor for driving the air impeller, a thermostatic switch exposed to and adapted to be held open under the influence of the heat of the apparatus, an electrical heater in heat exchanging relation to said switch, a source of electrical energy, an electrical circuit including said source, said switch, said electrical heater and the igniter, a shunt circuit in parallel relation to that part of the former circuit that includes the switch and electrical heater, said shunt circuit including the aforesaid motor, a second thermostatic switch exposed to and adapted to be held closed under the influence of the heat of the apparatus, a relay comprising coil and switch armature, a branch circuit in parallel relation to said igniter and including the armature of the relay while in the position it occupies when the relay is deenergized and including also the pump actuator, and a second branch circuit in series with said igniter and source and including the second mentioned thermostatic switch and the coil of said relay, said armature when in the position it occupies during energization of the relay cutting the pump actuator out of the first mentioned branch circuit, and a circuit including said armature in energized position and said second mentioned thermostatic switch and connecting the pump actuator directly to said source.

6. A system including the combination of elements recited by claim 5, plus: a fluid impeller for moving fluid heated by the apparatus, a second electric motor for operating said fluid impeller, and a further branch circuit leading from the second mentioned branch circuit at a point intermediate the second mentioned thermostatic switch and said relay and including the second mentioned motor and source.

7. In a system involving heating apparatus incorporating a liquid fuel burner and an air impeller for supplying combustion air to the burner, and electrical control means for said apparatus, a liquid fuel supply, a pump for moving fuel from said supply to the burner, an electrical actuator for the pump, an electrical igniter for the burner, an electric motor for driving the air impeller, a thermostatic switch exposed to and adapted to be held open under the influence of the heat of the apparatus, an electrical heater in heat exchanging relation to said switch, a relay comprising coil and switch armature, a source of electrical energy, an electrical ignition circuit including said source, the armature of said relay when in the position it occupies during energization of the relay, said thermostatic switch, said electrical heater and the igniter, a shunt circuit in series with the igniter and by-passing said armature, the thermostatic switch and the electrical heater and including the motor for driving the air impeller, and a circuit including control means in series with the coil of said relay and said source.

8. A system involving the combination of elements defined by claim 7, plus: a starting switch in the ignition circuit between the source of electrical energy and the shunt circuit, an overload cutout for preventing the starting switch from remaining closed when said overload cutout is subjected to a given value of current for a predetermined time, and a branch circuit in parallel relation to the igniter including said overload cutout, a time delay cutout comprising a second electrical heater, a heat absorber in heat exchanging relation to the latter, and a second thermostatic switch exposed to and adapted to be held closed under the influence of heat given off by said absorber, and a third branch circuit in parallel relation to said igniter and including said second electrical heater.

9. In a system involving heating apparatus incorporating a liquid fuel burner, and electrical control means therefor; a liquid fuel supply, a pump for moving fuel from said supply to the burner, an electrical actuator for the pump, an electrical igniter for the burner, a thermostatic switch exposed to the heat of the apparatus and adapted to be held open under the influence thereof, an electrical heater in heat exchanging relation to said switch, a starting switch, a source of electrical energy, an electrical ignition circuit including said source, the starting switch, said thermostatic switch, the electrical heater and the igniter, an "off-on" switch including one circuit closer that is effective when the switch is in "on" position and a second circuit closer that is effective when the switch is in "off" position, a branch circuit in parallel relation to said igniter and including the first circuit closer of the "off-on" switch and the pump actuator, an overload cutout which, when subjected to a given value of current for a predetermined time, prevents the starting switch from remaining closed, and a second branch circuit in parallel relation to said igniter and including said overload cutout and the second circuit closer of said "off-on" switch.

10. In a system involving heating apparatus incorporating a liquid fuel burner, and electrical control means therefor; a liquid fuel supply, a pump for moving fuel from said supply to the burner, an electrical actuator for the pump, an electrical igniter for the burner, a thermostatic switch exposed to the heat of the apparatus and adapted to be held open under the influence thereof, an electrical heater in heat exchanging relation to said switch, a source of electrical energy, an electrical ignition circuit including said source, said thermostatic switch, said electrical heater and the igniter, an air impeller for supplying combustion air to the burner, an electric motor for driving the same, a shunt circuit in parallel relation to that part of the former circuit that includes said thermostatic switch and said electrical heater and including said motor, a second thermostatic switch exposed to the heat of the apparatus and adapted to be held closed under the influence thereof, a relay including coil and switch armature, a branch circuit in series with said igniter and source and including the second mentioned thermostatic switch and the coil of the relay, a second branch circuit leading from the shunt circuit in parallel with said igniter and including the pump actuator and the armature of the relay when in the position it occupies during deenergization of the relay, the relay, when energized, moving its armature to interrupt connection of the second branch circuit with the shunt circuit, and a circuit including said thermostatic switch and a contact engaged by the armature when the relay is energized to connect said pump to said source.

11. A system involving the combination of elements defined by claim 10, plus: a fluid impeller for moving fluid heated by the apparatus, a second electric motor for driving said fluid impeller, and a further branch circuit leading from the first branch circuit between the second mentioned thermostatic switch and the coil of the relay and including the second mentioned motor and source.

ALLEN E. CLEVELAND.

REFERENCES CITED

The following references are of record in the file of this patent:

UNITED STATES PATENTS

| Number | Name | Date |
| --- | --- | --- |
| 2,074,168 | Danuser et al. | Mar. 16, 1937 |
| 2,159,658 | Hall | May 23, 1939 |
| 2,207,776 | Black | July 16, 1940 |
| 2,286,856 | Holthouse | June 16, 1942 |
| 2,308,887 | McCollum | Jan. 19, 1943 |
| 2,399,673 | Hall | May 7, 1946 |